United States Patent [19]

Sullins

[11] Patent Number: 4,802,940

[45] Date of Patent: Feb. 7, 1989

[54] METHOD FOR COATING PIPE WITH REFRACTORY MATERIAL

[75] Inventor: Harry P. Sullins, Columbia, S.C.

[73] Assignee: Richland Industrial, Inc., Columbia, S.C.

[21] Appl. No.: 887,989

[22] Filed: Jul. 25, 1986

Related U.S. Application Data

[63] Continuation of Ser. No. 521,451, Aug. 8, 1983, abandoned, which is a continuation-in-part of Ser. No. 386,638, Jun. 7, 1982, abandoned.

[51] Int. Cl.⁴ .............................................. B31B 1/00
[52] U.S. Cl. ...................................... 156/187; 156/425
[58] Field of Search ................ 156/187, 195, 425, 430, 156/173, 175

[56] References Cited

U.S. PATENT DOCUMENTS

| | | |
|---|---|---|
| 694,348 | 3/1902 | Carson .............................. 266/225 |
| 850,124 | 4/1907 | Badgley . |
| 1,137,432 | 4/1915 | Stokes . |
| 1,329,815 | 2/1920 | Thordarson . |
| 1,435,091 | 11/1922 | Stevens . |
| 1,506,891 | 9/1924 | Duncan . |
| 1,876,760 | 9/1932 | Rosener . |
| 1,996,491 | 4/1935 | Schnedarek et al. . |
| 2,269,405 | 1/1942 | Boucher ........................ 156/425 X |
| 2,360,109 | 10/1944 | Converse . |
| 2,447,070 | 8/1948 | Hooper .......................... 156/190 X |
| 3,292,939 | 12/1966 | Lorenz . |
| 3,430,940 | 3/1969 | Criss ................................. 266/225 |
| 3,974,009 | 8/1976 | Butzow . |
| 3,976,286 | 8/1976 | Thompson et al. ............... 266/225 |
| 3,979,246 | 9/1976 | Ikeda et al. . |
| 4,087,081 | 5/1978 | Michaelis ........................ 266/226 |
| 4,089,727 | 5/1978 | McLain . |
| 4,093,193 | 6/1978 | Cassidy et al. .................. 266/225 |
| 4,296,921 | 10/1981 | Hayashi ............................ 266/270 |
| 4,527,749 | 7/1985 | Matthews et al. . |
| 4,569,710 | 2/1986 | Lambot et al. ................... 156/172 |
| 5,059,712 | 11/1977 | Bothwell ............................ 156/89 |

FOREIGN PATENT DOCUMENTS

| | | |
|---|---|---|
| 528337 | 5/1954 | Belgium ........................... 266/226 |
| 2028987 | 3/1980 | United Kingdom . |

OTHER PUBLICATIONS

*The Making, Shaping and Treating of Steel*, United States Steel, 1971, p. 63.

The Making, Shaping and Treating of Steel, U.S. Steel (9th Ed.), pp. 36–65.

*Primary Examiner*—David Simmons
*Attorney, Agent, or Firm*—Pollock, Vande Sande & Priddy

[57] ABSTRACT

A method for coating an elongated pipe with a refractory material by turning the pipe to wind around it a web of porous material pulled from a dispenser and around a bar mounted within a trough in a position below the surface of a solution of refractory material in the trough. The leading end of the web is secured to the pipe by a tuck locking arrangement. The web is tensioned during the winding and relative movement is provided between the web dispenser and the turning pipe to provide tightly wound spiral windings of the coated web.

18 Claims, 8 Drawing Sheets

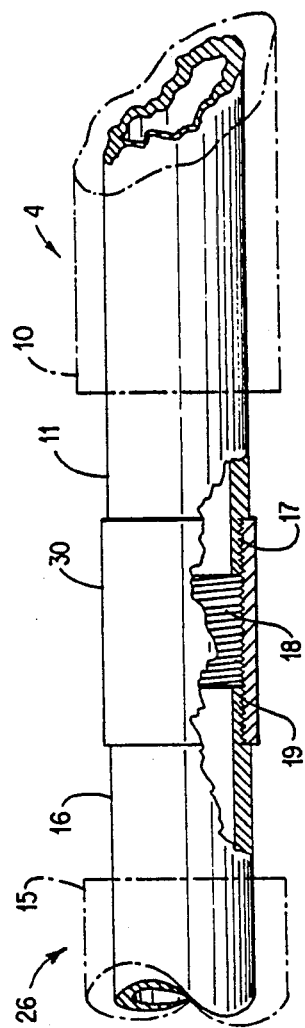
FIG. 3
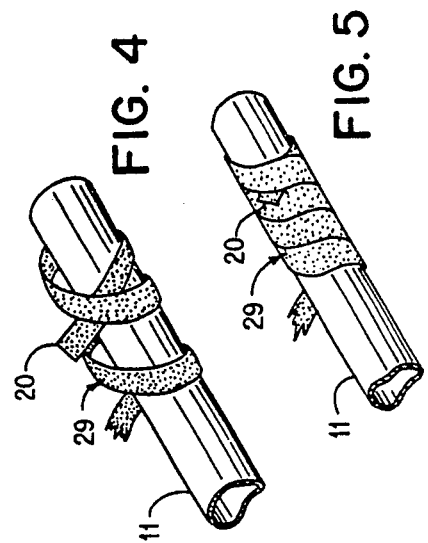
FIG. 4
FIG. 5
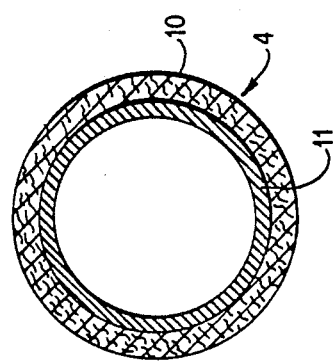
FIG. 2

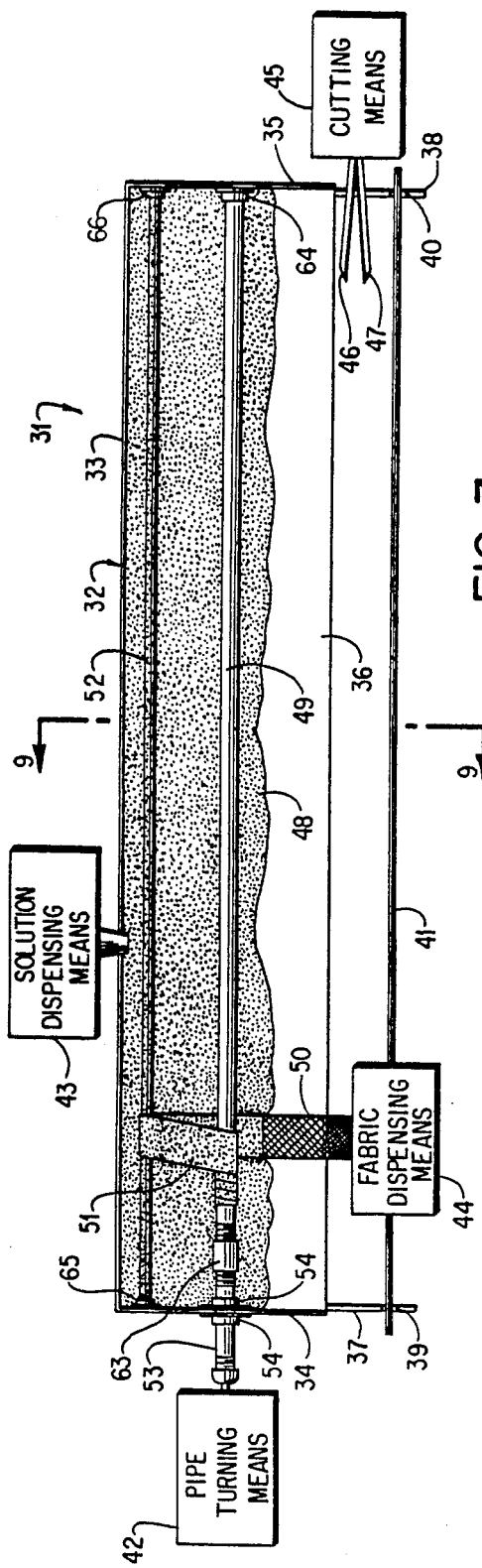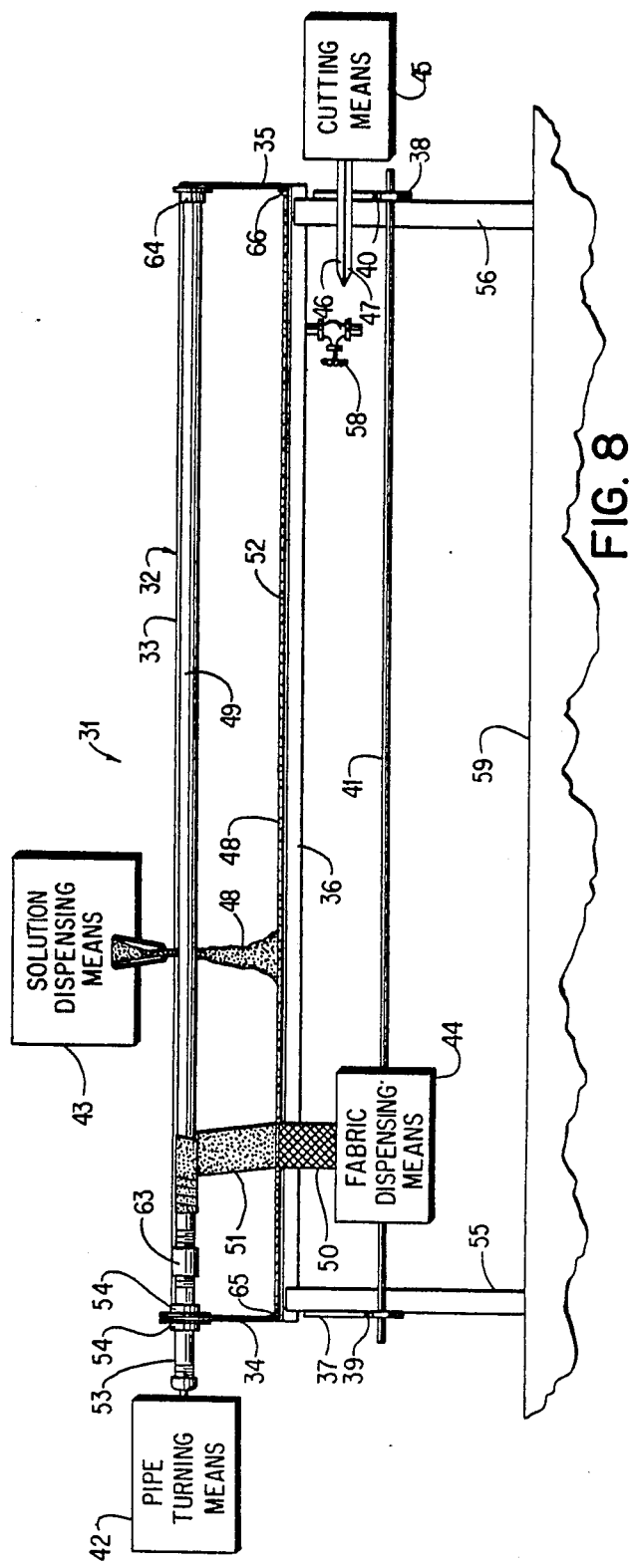
FIG. 7
FIG. 8

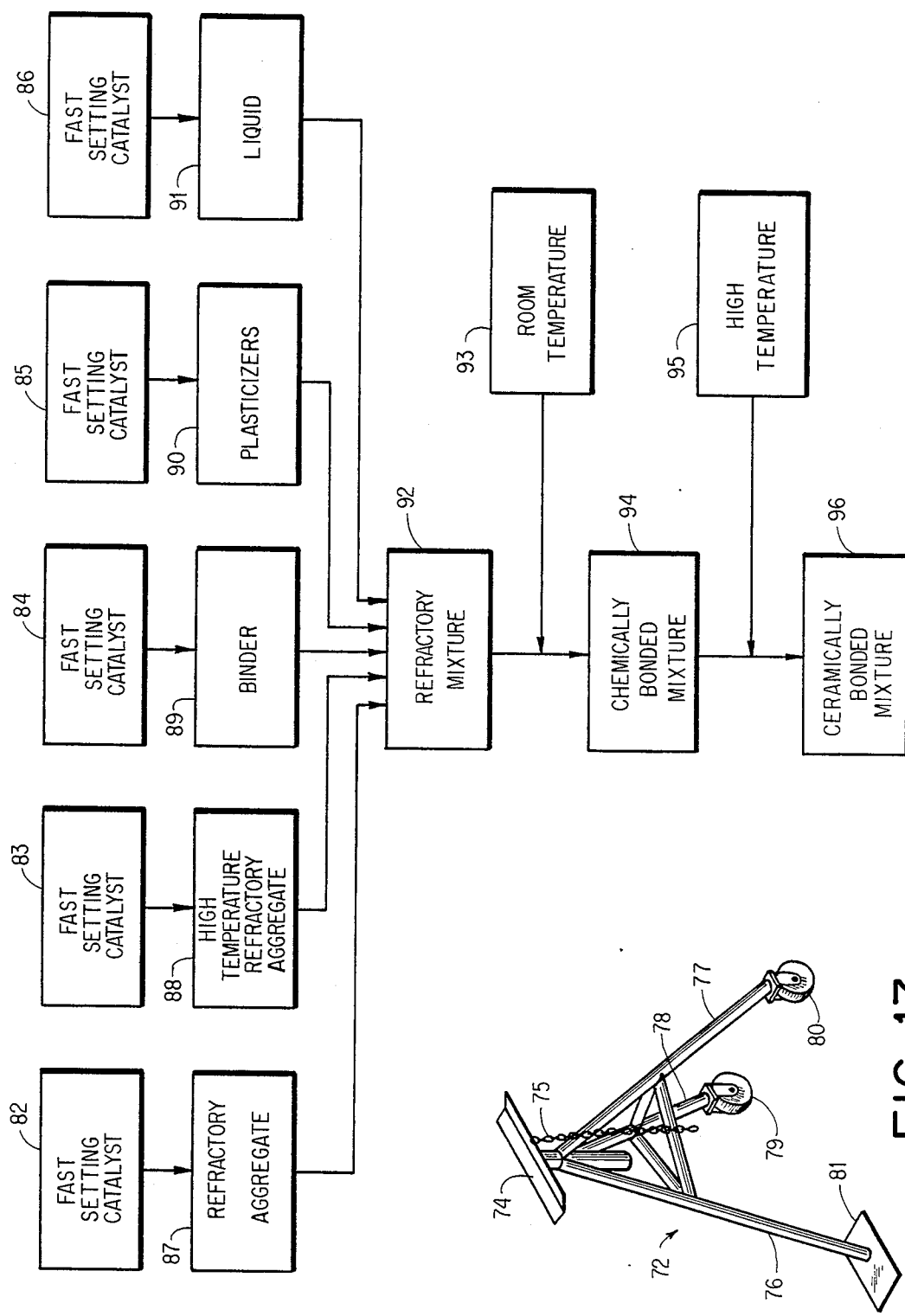

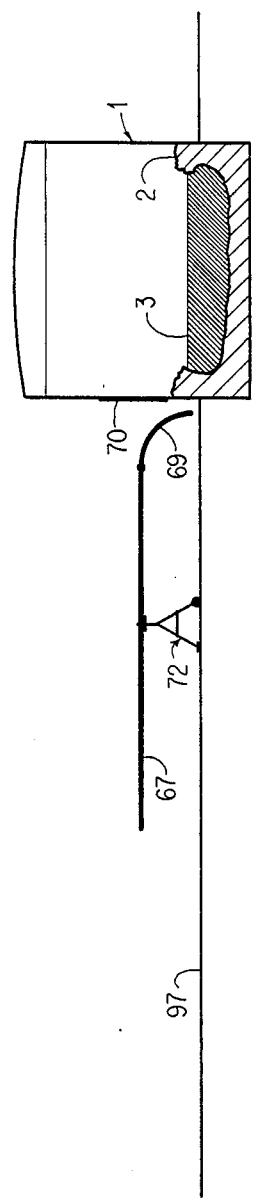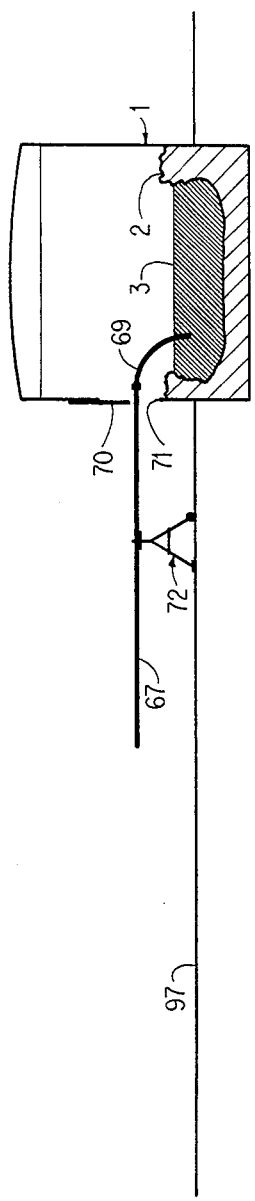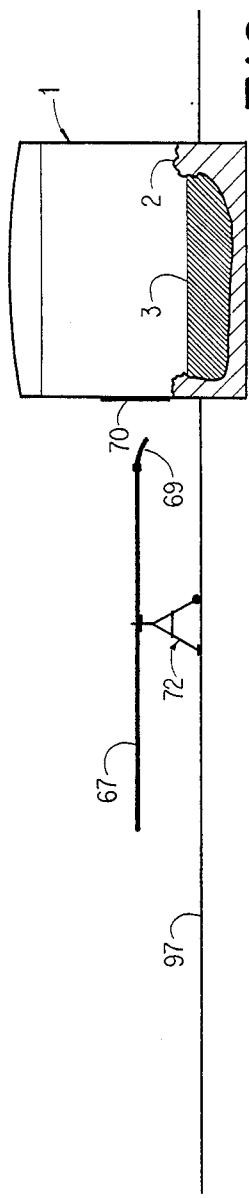

METHOD FOR COATING PIPE WITH REFRACTORY MATERIAL

This application is a continuation of application Ser. No. 521,451 filed Aug. 8, 1983, abandoned which was a continuation-in-part of Ser. No. 386,638 filed June 9, 1982, abandoned.

TECHNICAL FIELD

This invention relates to a product utilized in the melting and refining of ferrous or non-ferrous metals and more particularly to a product which improves or replaces an existing item used in the melting or processing of metal. A method and device for manufacturing the product is disclosed herein.

BACKGROUND OF THE INVENTION

In a blast furnace operation or similar operation for melting or processing metals, a pipe is utilized to inject a catalyst source into a vat to aid in the melting of the metal. Previously, the pipe used to transport the catalyst would be consumed rapidly within the vat and need to be replaced on a frequent basis. Disclosed herein is an improvement to that pipe. The improved pipe can perform the function of carrying the catalyst to the desired area while lasting many times the life span of the previously used pipe. Disclosed herein is a method and device for manufacturing this improved pipe. Further disclosed herein is a fast-setting, coated, bendable pipe.

DISCLOSURE OF THE INVENTION

An object of the present invention is to provide an improved transport means for placing a catalyst in a desired area within a melting vat.

A further object of the present invention is to utilize a pipe as a base structure for an improved transport means for providing a catalyst to a desired area within a melting vat.

Another object of the present invention is to provide means for securing a second transport means to a first transport means that has deteriorated in order to provide a relatively continuous flow of a catalyst to a desired area within a melting vat.

Still another object of the present invention is to wrap a web of pipe-coating material around a pipe which is to be used within a melting vat in order to extend the life span of the pipe.

A further object of the present invention is to surround a pipe with an insulated covering to enable the pipe to have a longer life span without the melting vat.

Another object of the present invention is to use a chemical solution in order to bind a wrapping material onto a pipe for use in a melting vat.

Still another object of the present invention is to immerse a wrapping material in a chemical solution prior to placing the wrapping material around a pipe for use in a melting vat.

A further object of the present invention is to provide a method and device for manufacturing the improved pipe.

A further object of the present invention is to vary the content of the chemical solution through which a wrapping material is immersed prior to being placed onto a pipe in order to provide maximum efficiency in providing insulating properties to the covering of a pipe used in a melting vat containing materials with differing Ph factors.

Another object of the present invention is to provide a chemical solution comprising a refractory mixture which is a homogenous mixture and is frictioned by a tension bar onto a material prior to the material being frictioned onto a pipe base.

Still another object of the present invention is to remove the excess of the homogenous mixture frictioned onto a material by skimming the excess from the material.

A further object of the present invention is to provide a pipe which may be shaped into a desired configuration after a homogenous mass is set around the pipe without breaking the pipe.

Another object of the present invention is to provide a fast-setting catalyst in a refractory mixture which forms the chemical solution which is frictioned onto a material which is secured around a pipe base to form a coated pipe which is fast-setting.

Still another object of the present invention is to provide a coated pipe which can be bent into the shape of a non-linear pipe with a radial bend without breaking the pipe.

These and other objects and features of the invention will be apparent from the following description and appended claims.

Briefly, the invention is a pipe for transporting a catalyst to a desired area of a melting vat comprising a pipe base and a material secured to and surrounding the pipe base. The pipe base is an elongated tubular structure with a continuous opening from the first end of the pipe base to the second end of the pipe base through which the catalyst may travel. The material secured to and surrounding the pipe base is operative to insulate the pipe base from external surroundings in the melting vat when the pipe is placed in the melting vat. A first connecting area is on the first end of the pipe base extending outward from the material which is secured around the pipe base. The second connecting area on the second end of the pipe base extends outward from the material which is secured around the pipe base. The first connecting area has a threaded portion. The second connecting area has a threaded portion.

The material is treated with a chemical solution to improve the insulating properties of the pipe. The material may be treated with a binding solution to aid in holding the material onto the pipe base. The material may comprise a layer of material provided by wrapping a web of material around the pipe base. The end of the web of material may be secured under the wrapping of the layer of material in order to aid in holding the material onto the pipe base. The material may be treated with a chemical solution to improve the insulating properties of the pipe. The web of material may be immersed in a chemical solution prior to being wrapped around the pipe base. The layers of material may be treated with a chemical solution after being placed around the pipe base to improve the insulating properties of the pipe.

A device is disclosed for placing a web of material around a pipe. The device has a trough, securing means positioned above the base of the trough, turning means, and material dispensing means. The securing means is operative to rigidly secure the pipe. The turning means is rigidly secured to the securing means and is operative to turn the securing means and the pipe attached thereto. The material dispensing means is operative to dispense a web of material which is secured to the pipe and which is placed around the pipe when the turning means turns the pipe.

A chemical solution is placed within the trough through which the web of material is moved prior to being placed around the pipe. Bar means is secured within the trough above the base of the trough. The web of material is pulled around the bar means in order to move the material through the chemical solution and onto the pipe. Solution dispensing means is located outside of the trough and is operative to place the chemical solution into the trough.

Cutting means is operative to cut the web of material which is dispensed from the material dispensing means when the material has been completely placed around portion of the pipe to be coated. The securing means comprises a drive connection portion which connects to the turning means and a coupler which connects to the pipe connection portion and to which the drive is rigidly secured.

The method for placing material around a pipe comprises securing the pipe above a trough, securing material from a material dispensing means to the pipe, and turning the pipe. When the pipe is turned, the material is pulled from the material dispensing means around the pipe. Chemical solution is placed into the trough and the material is pulled through the chemical solution when the pipe is turned.

The method further comprises placing bar means within the trough around which the material may move in order to pull the material through the chemical solution when the pipe is turned. The method further comprises moving the material dispensing means along the length of the trough, thereby enabling the material to be placed around the length of the pipe. The method comprises cutting the material from the material dispensing means after the material has been placed around the length of the pipe. The method further comprises removing excess chemical solution from the material after the material has been placed around the length of the pipe. The method further comprises removing the pipe from above the trough after the material has been placed around the length of the pipe and placing the pipe into position to dry.

The invention is a pipe for transporting a catalyst to a desired area of a melting vat comprising a pipe base, a material secured to and surrounding the pipe base, and chemical solution frictioned onto the material. The pipe base is an elongated tubular structure with a continuous opening from the first end of the pipe base to the second end of the pipe base through which the catalyst may travel. The material is secured to and surrounds the pipe base and is operative to insulate the pipe base from external surroundings in the melting vat when the pipe is placed into the melting vat.

The chemical solution comprises a refractory mixture which is a homogenous mixture. The homogenous mixture is frictioned by a tension bar onto the material prior to the material being frictioned onto the pipe base. The excess of the homogenous mixture on the material is skimmed from the material.

The refractory mixture comprises a fast-setting catalyst whereby the homogenous mixture will set quickly after being frictioned onto the material and the material frictioned onto the pipe base forming the pipe. The pipe base is covered with a homogenous mass composed of the homogenous mixture and the material. The refractory mixture comprises a refractory aggregate, a high temperature refractory aggregate, a binder, plasticizers, liquid and a fast-setting catalyst. The refractory mixture, at room temperature, forms a chemically-bonded mixture. The refractory mixture, at high temperatures, forms a ceramically-bonded mixture. The fast-setting catalyst may be added to the refractory aggregate prior to the refractory aggregate being placed into the refractory mixture. A fast-setting catalyst may be added to the high temperature refractory aggregate prior to the high temperature refractory aggregate being placed into the refractory mixture. A fast-setting catalyst may be added to the binder prior to the binder being placed into the refractory mixture. A fast-setting catalyst may be added to the plasticizers prior to the plasticizers being placed into the refractory mixture. A fast-setting catalyst may be added to the liquid prior to the liquid being placed into the refractory mixture. The liquid may be potable water. The proportions of each component of the refractory mixture may be determined relative to the Ph value of the metal in the melting vat. The pipe may be shaped into a desired configuration after the homogenous mass is set and cured, without breaking the pipe or the homogenous mass. The pipe may be shaped into a configuration of a non-linear pipe with a radial bend. The radius of the radial bend may be from 60° to 90°.

A process for transporting a catalyst to a desired area of a melting vat comprises providing a source of catalyst, utilizing transport means to transport the catalyst, and securing a non-linear pipe with a radial bend to the transport means. Leveling means is also utilized to level the transport means. The transport means transports the catalyst to the desired area of the melting vat. A non-linear pipe with a radial bend is secured to the transparent means, placing the end of the pipe opposite the transport means into the desired area of the melting vat.

BRIEF DESCRIPTION OF THE DRAWINGS

The invention will be more fully understood from the following detailed description and appended claims when taken with the drawings in which:

FIG. 2 is a sectional view of catalyst dispensing pipe 4 taken at section 2—2 of FIG. 1.

FIG. 3 is a partial sectional view of a new catalyst dispensing pipe 26 being secured onto the catalyst dispensing pipe 4.

FIG. 4 is a partial isometric view of the pipe base 11 being wrapped with a layer 29 of coated material showing the layer 29 of coated material in loose form.

FIG. 5 is a partial isometric view of pipe base 11 being wrapped with a layer 29 of coated material showing the layer 29 of coated material drawn tightly around the pipe base 11.

FIG. 7 is a top view of pipe coating device 31.

FIG. 8 is a front elevational view of pipe coating device 31.

FIG. 11 is a flow diagram showing the chemical composition of a chemical solution that can be utilized for chemical solution 24 or chemical solution 48.

FIG. 14 is a schematic representation of curved dispensing pipe 69 secured to leveling means 72 prior to insertion in melting vat 1.

FIG. 15 is a schematic representation of curved dispensing pipe 69 secured to leveling means 72 in position within melting vat 1.

FIG. 16 is a schematic representation of curved dispensing pipe 69 secured to leveling means 72 after being removed from melting vat 1.

FIG. 17 is an isometric view of a leveling means 72.

DESCRIPTION OF BEST MODE AND OTHER EMBODIMENT

Figure 1:
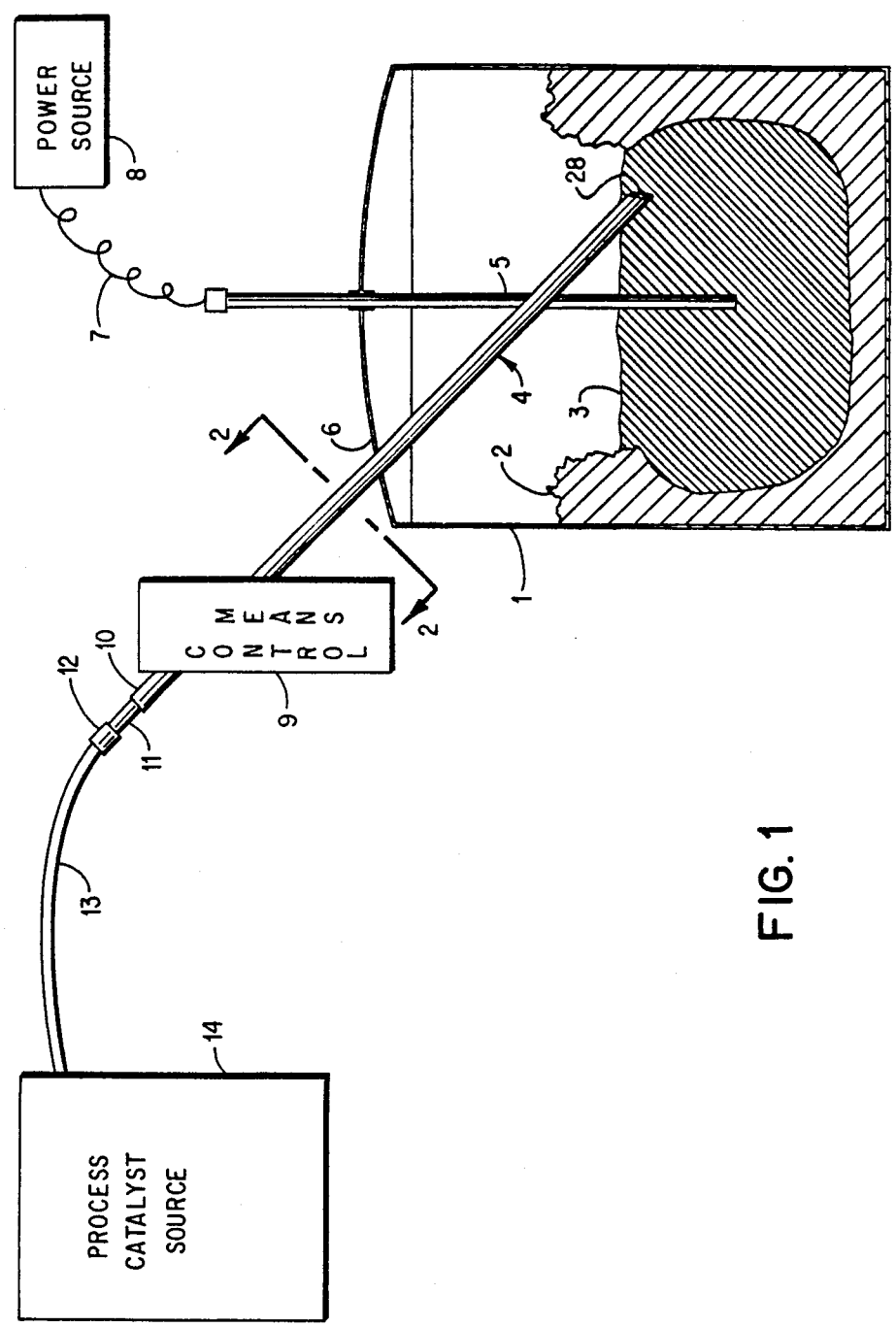
FIG. 1 is a schematic representation of a catalyst dispensing pipe 4 being utilized within melting vat 1.

Referring now to the drawings, FIG. 1 is a schematic representation of a catalyst dispensing pipe 4 being utilized within melting vat 1. Melting vat 1 could be a vat which is utilized in melting or processing steel or any form of ferrous or non-ferrous metal. Melting vat 1 can be a portion of a melting furnace. Melting vat 1 is shown having a melting electrode 5 connected by wiring 7 to a power source 8. Melting electrode 5 melts the scrap metal 2 within the melting vat 1 into a molten solution 3. Any number of melting electrodes 5 may be utilized.

The catalyst dispensing pipe 4 may be placed through opening 6 in melting vat 1 with the end 28 of catalyt dispensing pipe 4 being placed at any desired area within the melting vat 1. Through catalyst dispensing pipe 4 flows a catalyst from process catalyst source 14. The catalyst flows through catalyst transporting tube 13 and through pipe coupling 12 into the catalyst dispensing pipe 4.

The catalyst dispensing pipe 4 comprises a pipe base 11 with a coating material 10 secured thereon. Control means 9 moves the catalyst dispensing pipe 4 within the melting vat 1. Control means 9 may be any human or mechanical control means desired.

The process catalyst source 14 may be a catalyst of pure oxygen or a mixture of air, oxygen, and propane, or any combustion catalyst desired. The control means 9 may be any pipe movement control means, including automatic machinery or manual means. The control means 9 aims the movement of the catalyst dispensing pipe 4 in a manner so that the catalyst is being virtually sprayed into the desired area. The catalyst aids the combustion and causes the scrap metal 2 to melt into the molten solution 3.

FIG. 2 is a sectional view of catalyst dispensing pipe 4 taken at section 2—2 of FIG. 1. Catalyst dispensing pipe 4 has a pipe base 11 and a coating material 10 wrapped around the pipe base 11. The coating material 10 comprises a plurality of layers 29 of coated material. The layers 29 of coated material are wrapped around the pipe base 11 to form an insulating cover for the pipe base 11. A binder may be applied to the coating material 10 to hold the layers 29 of coated material in place.

A chemical solution may be added to the layers 29 of coated material to provide further insulating qualities to the coating material 10. If desired, more insulating coatings could be added after the layers 29 of coated material are wrapped around the pipe base 11.

The layer 29 of coated material can be immersed in the coating chemical solution or the coating can be applied to the layer 29 in any manner desired. Various materials may be utilized in forming the coating material 10. The layer may be burlap, fiberglass, wool, or other rolled web material. This material may be impregnated with any desired chemical solution. The chemical solution used to impregnate the material may be any desired chemical solution which will aid in furthering the insulating qualities of the material.

The chemical solution may be comprised of kaolin products, clay, aluminum, chrome-based or any type of refractory compound, or any desired chemical solution or compound. The chemical solution utilized may be varied in order to maximize efficiency depending on the metals being melted within the melting vat 1. Considerations for the metals being melted and the Ph values thereof, along with other factors, will be utilized in determining the exact content of chemical solutions utilized in forming the coating material 10 on catalyst dispensing pipe 4.

FIG. 3 is a partial sectional view of a new catalyst dispensing pipe 29 being secured onto the catalyst dispensing pipe 4. The invention herein extends the life span of the pipe base 11 considerably. However, after a period of time, even the newly developed catalyst dispensing pipe 4 will deteriorate within the melting vat 1. As the end 28 of catalyst dispensing pipe 4 deteriorates, more of the catalyst dispensing pipe 4 will be extended within the melting vat 1 in order to place the end 28 into the desired area.

As the deterioration approaches a pre-determined length of the catalyst dispensing pipe 4, the catalyst dispensing pipe 4 is removed from the melting vat 1. The end of catalyst dispensing pipe 4, which is secured to pipe coupling 12, is disconnected.

Pipe coupling 12 is then connected to one end of a new catalyst dispensing pipe 26. The other end of new catalyst dispensing pipe 26 is secured to non-reused pipe coupling 30. The remaining section of catalyst dispensing pipe 4 is also secured to the non-reused pipe coupling 30. Thereby, when the catalyst dispensing pipe 4 is extended back into the melting vat 1, the complete length of the catalyst dispensing pipe 4 is utilized prior to its disintegration. The non-reused pipe coupling 30 disintegrates and the second catalyst dispensing pipe 26 becomes the means for the catalyst to enter the appropriate area of the melting vat 1 until the eventual disintegration of the new catalyst dispensing pipe 26. Thereafter, the replacement process is continuously repeated.

As shown in FIG. 3, the catalyst dispensing pipe 26 has a pipe base 16, with a coating material 15 secured around the pipe base 16. A small portion of the pipe base 16 extends out from the coating material 15. The pipe base 16 has a threaded end 19 which is secured within the threads 18 of non-reused coupling 30. The pipe base 11 of catalyst dispensing pipe 4 has a small area extending out from the coating material 10. The pipe base 11 has threads 17 which are secured within threads 18 in non-reused pipe coupling 30. The catalyst dispensing pipe 4 is to be rigidly secured to the new catalyst dispensing pipe 26 by the non-reused pipe coupling 30. Connecting threaded ends, the entire portion of the catalyst dispensing pipe 4 is utilized until the entire pipe has disintegrated or melted.

FIG. 4 is a partial isometric view of pipe base 11 being wrapped with a layer 29 of coated material showing the layer 29 of coated material in loose form. The material may be wrapped in any manner desired around the pipe base 11.

One desirable method of wrapping the material is to wrap the end 20 of the layer 29 of coated material under the wrapped layer 29 so as to form somewhat of a lock at the beginning of the wrapping in order to aid in securing the layer 29 of coated material onto the pipe base 11. The end 20 is placed underneath the wrapping and then may be wrapped over in order to secure the plurality of layers 29 of coated material onto the pipe base 11.

FIG. 5 is a partial isometric view of pipe base 11 being wrapped with a layer 29 of coated material showing the layer 29 of coated material drawn tightly around the pipe base 11. The end 20 of layer 29 of coated material is shown tucked tightly under the wrapped layer 29 of coated material in order to aid in securing the layers 29 of coated material onto the pipe base 11.

FIGS. 4 and 5 have been illustrated in a manner to show the wrapping of the layers 29 of coated material around the pipe base 11. In practice, the layers 29 of coated material may be wrapped in any desired manner with material of any desired width. The layers 29 of coated material may be wrapped so that the wrappings are any distance apart desired and any thickness desired. Chemical solution may be added to the layers being wrapped prior to the layers being wrapped, during the time the layers are wrapped, or after the wrapping process is completed.

Figure 6:
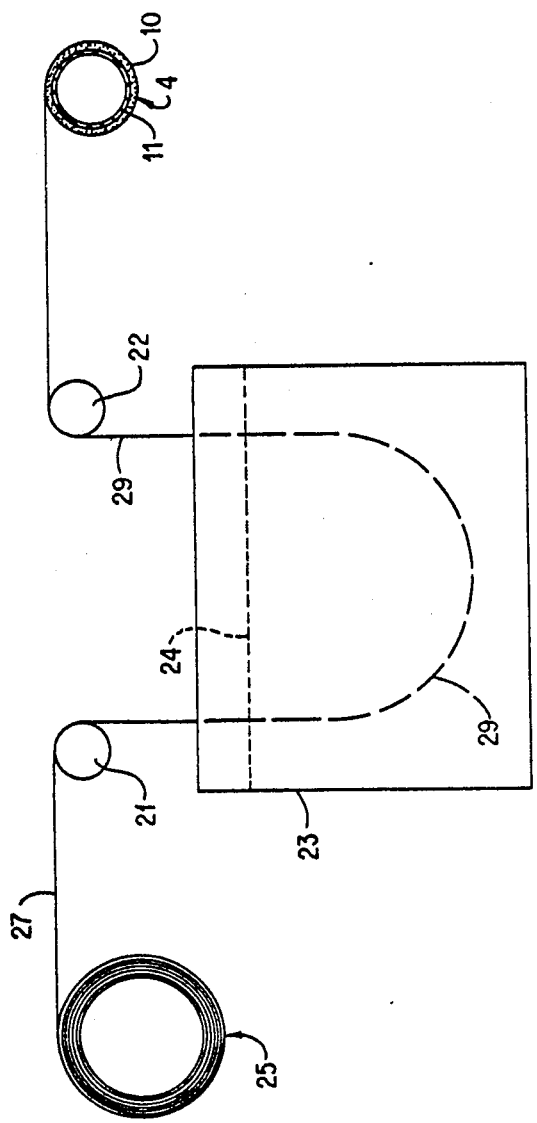
FIG. 6 is a schematic representation of an uncoated layer 27 of material being removed from material roll 25 and being coated with a chemical solution 24 to become a layer 29 of coated material which is wrapped around pipe base 11 to form the catalyst dispensing pipe 4.

FIG. 6 is a schematic representation of an uncoated layer 27 of material being removed from material roll 25 and being coated with a chemical solution 24 to become a layer 29 of coated material, which is wrapped around pipe base 11 to form the catalyst dispensing pipe 4. FIG. 6 is a schematic representation. Layer 27 of uncoated material is shown entering over roller 21 into a chemical solution vat 23 containing a chemical solution 24. The layer 27 of uncoated material becomes a layer 29 of coated material, with the layer 29 being thoroughly immersed in and coated by the chemical solution 24. The layer 29 of coated material is shown exiting over a second roller 22 and being wrapped around the pipe base 11 in order to form the coating material 10 of catalyst dispensing pipe 4.

The uncoated layer 27 of material can be immersed in the coating chemical solution 24 or the coating can be applied to the uncoated layer 27 in any manner desired. Various material may be utilized in forming the coating material 10. The uncoated layer 27 may be burlap, fiberglass, wool, or other porous web material. This uncoated layer 27 may be impregnated with any desired chemical solution 24. The chemical solution 24 used to impregnate the uncoated layer 27 of material may be any desired chemical solution which will aid in furthering the insulating qualities of the material.

FIG. 7 is a top view of pipe coating device 31. The pipe coating device 31 has a solution holding trough 32. The solution holding trough 32 has a back panel 33, a side panel 34, and a side panel 35. The solution holding trough 32 has a bottom panel 36.

Utilized with the solution holding trough 32 are pipe turning means 42, fabric dispensing means 44, and solution dispensing means 43. To utilize the pipe coating device 31, an improved pipe 49 is secured onto coupling 63. Coupling 63 is secured to a drive connection portion 53 which extends through a bearing flange 54. Pipe connection portion 53 is connected to drive turning means 42.

The improved pipe 49 being secured on one end to coupling 63, has its other end placed into the end bearing flange 64. The end bearing flange 64 and the bearing flange 54 allow the pipe connection portion 53, coupling 63, and improved pipe 49 to be secured as the entire length is turned by pipe turning means 42.

Fabric dispensing means 44 may be placed onto a fabric dispensing bar 41. Fabric dispensing bar 41 may be supported by fabric dispensing bar supports 37 and 38. Fabric dispensing bar 41 may be placed into fabric dispensing bar securing slot 39 in fabric dispensing bar support 37, and in fabric dispensing bar securing slot 40 in fabric dispensing bar support 38.

If this configuration is utilized, the fabric dispensing bar 41 may be lifted from fabric dispensing bar supports 37 and 38 and a new fabric dispensing means 44 can be added to replace the old fabric dispensing means 44, when all of the fabric or web material is dispensed from the original fabric dispensing means 44.

The fabric or web material 50 extends into the solution holding trough 32 and around tension bar 52. Tension bar 52 can turn and is secured by bar bearing flanges 65 and 66. Bar bearing flange 65 is within side panel 34 of solution holding trough 32. Bar bearing flange 66 is within side panel 35 of solution holding trough 32. The solution dispensing means 43 dispenses solution into the area of solution holding trough 32 where the fabric or web material 50 passes through the solution and around the tension bar 52. The chemical solution 48 adheres to the fabric or web material 50 to become a coated wrapping material 51. The coated fabric or coated wrapping material 51 is tucked onto the improved pipe 49.

Figure 9:
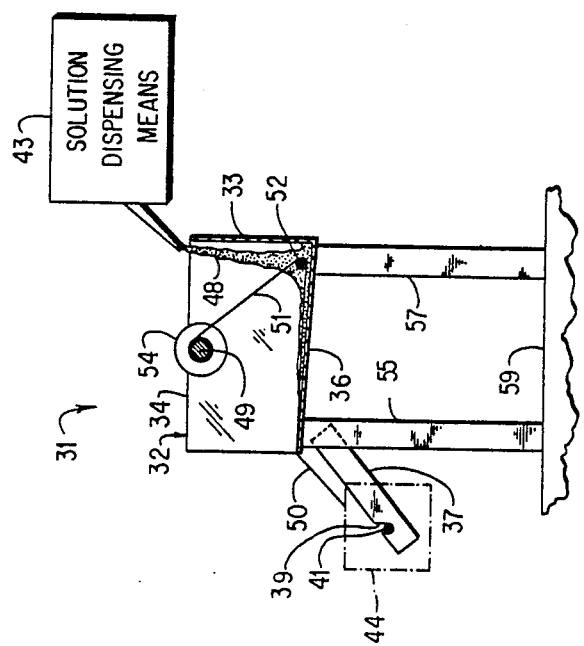
FIG. 9 is a cross-sectional view of pipe coating device 31 taken at section 9—9 of FIG. 7.

The pipe turning means 42 is activated to turn the drive connection portion 53 which is rigidly secured to the improved pipe 49. The improved pipe 49 turns and the coated fabric 51 is wrapped around the improved pipe 49. While being wrapped, the coated fabric 51 is tensioned by tension bar 52, and by being pulled around the outer edge of bottom panel 36 of trough 32 which serves as a drag member as shown in FIG. 9. The fabric dispensing means 44 may be moved along fabric dispensing bar 41 in order to determine the thickness and angle of coated fabric 51 covering placed onto the improved pipe 49.

When the coated fabric or coated wrapping material 51 has covered improved pipe 49 throughout the length of the improved pipe 49, a cutting means 45 may cut the coated fabric 51. The end of the cut fabric will be wrapped onto the improved pipe 49. The cutting means may be blades 46 and 47 which cut the fabric or web material 50 adjacent to fabric dispensing means 44 as illustrated in FIGS. 7 and 8.

The excess chemical solution 48 on the improved pipe 49 may then be removed. The improved pipe 49 will then be uncoupled from the coupling 63 and removed from pipe coating device 31 in order to dry. The dried improved pipe 49 may be utilized as previously discussed herein.

FIG. 8 is a front elevational view of pipe coating device 31. The pipe turning means 42 is connected to the drive connection portion 53 which extends through bearing flange 54 to be connected to coupling 63. Bearing flange 54 may be one or more flanges on the inside and outside of the side panel 34 through which the pipe connection portion 53 may extend and turn within.

The pipe turning means 42 may be any type of pipe turning means from the simple manual pipe turning movement to any type of complex pipe turning apparatus desired. The pipe turning means 42 may be simply a motorized rotational turning means, such as a drill.

The fabric dispensing means may be any type of fabric dispensing means from the simplest to the most complex. The fabric dispensing means may be simply a roll of fabric being unwound as the improved pipe 49 is rotated and pulls on the roll of fabric.

The solution dispensing means 43 may be any type of automated solution dispensing system or may be a very simple solution dispensing means, as simple as a person pouring solution into the solution holding trough 32.

The cutting means 45 may be any type of cutting means from the simplest to the most complex, including a manual act of cutting the fabric roll with shears.

The web material or fabric 50, when coated with solution 48, becomes a coated wrapping material 51. The angle and depth of the coating on the improved pipe 49 is dependent on the manner in which the fabric dispensing means 44 is moved along the fabric dispensing bar 41.

The pipe coating device 31 may be supported in any manner. The pipe coating device 31 may have support legs, such as support legs 55, 56, 57, and a fourth leg not shown in the drawings.

The bottom panel 36 of the solution holding trough 32 may have a solution drain valve 58 in order to drain and clean the bottom panel 36 and the interior of solution holding trough 32. The pipe coating device 31 may be placed on any surface, such as floor 59.

FIG. 9 is a cross-sectional view of the pipe coating device 31 taken at section 9—9 of FIG. 7. The solution holding trough 32 may be of any shape or size desired. The bottom panel 36 and the back panel 33 of solution holding trough 32 may be placed at any desired angle to form an angled rear to hold the chemical solution 48 in the area where the fabric or web material 50 passes around tension bar 52 and becomes coated with solution 48 to become coated wrapping material or coated fabric 51.

Figure 10:
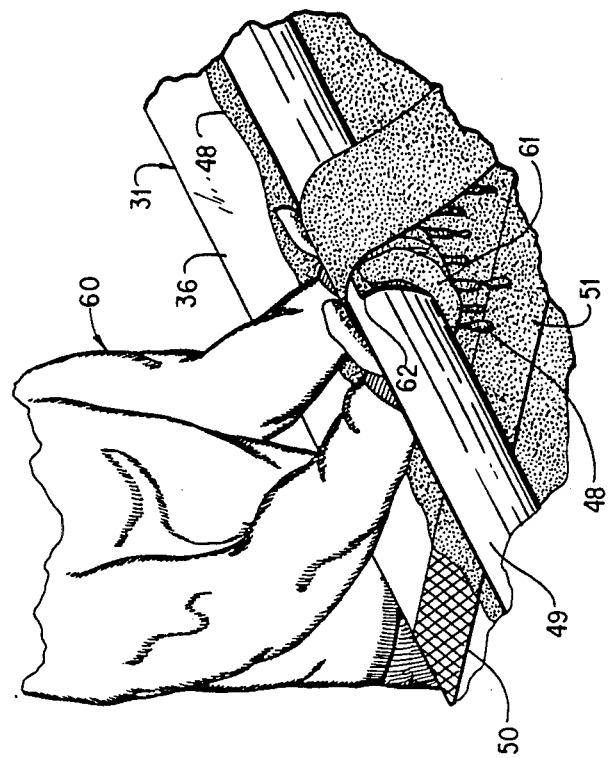
FIG. 10 is a partial isometric view of a tucking procedure utilized in the method and device of manufacturing the improved pipe 49.

FIG. 10 is a partial isometric view of a tucking procedure utilized in the method and device of manufacturing the improved pipe 49. A human worker 60 with hands 61 may physically tuck the leading edge 62 of coated wrapping material 51 under the oncoming coated material to form a tight tuck lock. In this tuck lock, the coated material is brought over the top of the improved pipe 49, wound completely around it, and placed back up under the coated material 51 which is coming forth from around the tension bar 52 and through the chemical solution 48.

The coated material or coated fabric 51 being pulled through the chemical solution 48 actually has both sides of the original fabric or web material 50 coated with solution 48.

When the leading edge 62 of the coated wrapping material 51 is tucked under the oncoming coated material 51, the coated material 51 is secured to the improved pipe 49. When the improved pipe 49 is turned by the pipe turning means 42, more of the coated wrapping material 51 is pulled toward the pipe 49. As the fabric dispensing means 44 is moved along the fabric dispensing bar 41, the coated material 51 moves along the tension bar 52 and wraps around the improved pipe 49 in a position dependent upon the position of the fabric dispensing means 44. Any angle of wrapping or depth of wrapping can be obtained depending on the desire of the user of the pipe coating device 31.

The pipe coating device 31 can be utilized with the most mechanical means available or with simple manual means to perform the functions of pipe turning, fabric dispensing, solution dispensing, cutting, and movement of the fabric dispensing means. The fabric dispensing means 44 would include not only means to dispense the fabric from the fabric dispensing means 44, but means to move the fabric dispensing means 44 along the fabric dispensing bar 41. The human worker 60 may actually control movement of the fabric dispensing means 44 with a portion of his body, such as his leg or knee. The solution dispensing means 43 may simply be a worker pouring in the solution 48 into the solution holding trough 32.

The coated wrapping material 51 may be secured onto the improved pipe 49 by the tuck method described herein or any other method desired. The tuck method provides a firm attachment of the coated material 51 to the improved pipe 49.

The excess solution may be removed by any removal means desired or may be removed by the movement of a human hand along the improved pipe 49. The excess may be removed while the pipe 49 is over the solution holding trough 32 so that excess solution 48 will drop back into the trough 32 to be re-utilized.

The fabric 50 may be cut by the cutting means several inches before the end of the improved pipe 49 is covered with the coated material 51. The operator may then physically wrap the remainder of the cut coated material 51 around the improved pipe 49. When the improved pipe 49 is only partialy covered with coated material 51 and the coated material 51 runs out, the fabric dispensing means 44 can be replaced and the process begun anywhere along the improved pipe 49 desired. By tuck locking the coating material 51 to the improved pipe 49, pressure is forced onto the coated material 51 so that it does not come off of the improved pipe 49.

Various means can be utilized to perform the various functions of the pipe coating device 31 and the method in which the improved pipe 49 is coated, all of which are within the scope of this invention.

The improved pipe 49 of FIGS. 7-10 is similar to the catalyst dispensing pipe 4 in FIGS. 1-6. The chemical solution 24 may be similar to the chemical solution 48. The layers 29 of coated material 10 on pipe base 11 are similar to the coating material 51.

The chemical solution may be comprised of kaolin products, clay, aluminum, chrome-based, or any type of refractory compound, or any desired chemical solution or compound. The chemical solution utilized may be varied in order to maximize efficiency depending on the metals being melted within melting vat 1. Considerations for the metals being melted and the Ph values thereof, along with other factors, will be utilized in determining the exact content of chemical solutions utilized in forming the coating material 10 on catalyst dispensing pipe 4.

The chemical solution 24 may also include a binding material to aid in holding the layers 29 of coated material onto the pipe base 11. A binding solution may be contained within the chemical solution 24, or may be added to the wrapping process at any stage desired, or may be unnecessary because of the material used and the properties of the chemical solution 24 being utilized. Different chemical solutions could be used for ferrous or non-ferrous metals within melting vat 1. Different chemical solutions may be utilized for metals within melting vat 1 with varying Ph factors.

The improved pipe utilizes a pipe as a base structure for an improved transport means for providing a catalyst to a desired area within a melting vat. A pipe coating material will be wrapped around the pipe in order to extend the life span of the pipe while it is being utilized to provide a catalyst within a melting vat. Wrapping material or pipe-coating material may be immersed in a chemical solution prior to being placed around the pipe for use in a melting vat. The content of the chemical solution may be varied in order to provide maximum efficiency in providing insulating properties to the covering of the pipe used in a melting vat containing materials with differing Ph factors.

A binding solution may be utilized to hold the wrapping material onto the pipe being used in a melting vat. Disclosed herein are means to secure a second improved transport means or catalyst dispensing pipe to a first improved transport means or catalyst dispensing pipe after the first improved transport means has deteriorated. A relatively continuous flow of a catalyst is provided to a desired area within a melting vat. The wrapping material surrounding the pipe provides an insulation to the pipe which enables the pipe to have a longer life span within the melting vat.

The melting vat 1 contains a molten solution 3 which is melting metal, such as scrap metal 2, at extremely high temperatures. The high temperature causes the pipe to melt into the molten solution 3. Therefore, the insulation material, which is placed onto the pipe base 11 in the present invention, enables the pipe to be insulated and to withstand the higher temperatures better than the uninsulated pipe. Thereby, the improved pipe lasts longer within the melting vat 1 and is more economical to use.

The pipe coating device 31 can be utilized with the most mechanical means available or with simple manual means to perform the functions of pipe ring turning, fabric dispensing, solution dispensing, cutting, and movement of the fabric dispensing means. Various means can be utilized to perform the various functions of the pipe coating device 31 and the method in which the improved pipe 49 is coated, all of which are within the scope of this invention.

FIG. 11 is a flow diagram showing the chemical composition of a chemical solution that can be utilized for chemical solution 24 or chemical solution 48. As shown in FIG. 11, a refractory mixture 92 is produced from a combination of refractory aggregate 87, high temperature refractory aggregate 88, binder 89, plasticizers 90, and liquid 91. According to this invention, the speed in which the refractory mixture 92 sets can be increased in several ways. A fast-setting catalyst 82 might be added to refractory aggregate 87. A fast-setting catalyst 83 might be added to high temperature refractory aggregate 88. A fast-setting catalyst 84 might be added to binder 89. A fast-setting catalyst 85 might be added to the plasticizers 90. A fast-setting catalyst 86 might be added to liquid 91. In each case, some ingredient or amount of ingredients might also be removed from refractory aggregate 87, high temperature refractory aggregate 88, binder 89, or plasticizers 90 prior to the additional of the ingredient which acts as a fast-setting catalyst.

The refractory mixture 92, at room temperature 93, will chemically bond due to the nature of the ingredients of the refractory mixture 92. When the chemically-bonded mixture is subjected to high temperature 95, a ceramically-bonded mixture 96 results. This ceramically-bonded mixture 96 could have a ceramic bond with a glassy phase, as well as crytalline phases which bond or hold the aggregates together.

The refractory aggregate 87 may simply be calcined kaolin, which is a refractory aggregate, or may be a combination of refractory aggregates utilized as refractory aggregate 87.

Figure 13:
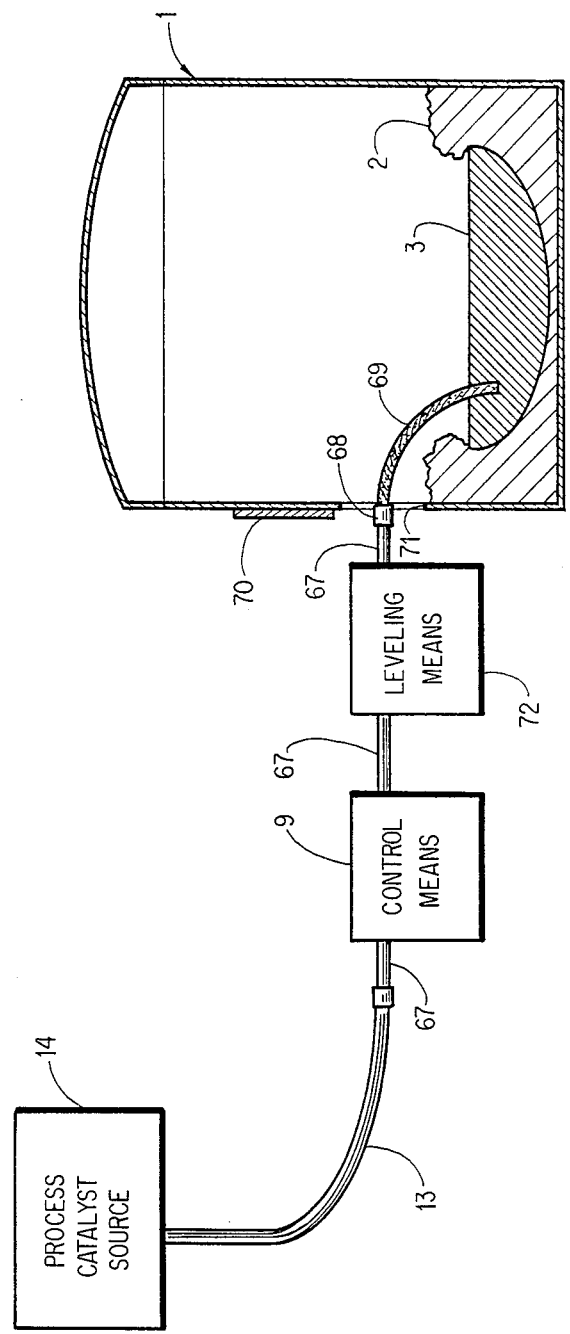
FIG. 13 is a schematic representation of curved dispensing pipe 69 being utilized in melting vat 1.

FIG. 13 is a schematic representation of curved dispensing pipe 69 being utilized in melting vat 1. In FIG. 1, a catalyst dispensing pipe 4 is shown being utilized in the melting or processing of steel or any form of ferrous or non-ferrous metal. Any desired plurality of catalyst dispensing pipes 4 may be utilized.

In that process, it may be desirable to place more catalyst into the melting vat 1. The process catalyst source 14 may be a catalyst of pure oxygen or a mixture of air, oxygen, and propane, or any combustion catalyst desired. The catalyst dispensing pipe 4 enters from above the melting vat 1 at an angle down into the molten solution 3. More catalyst can be added through the door opening 71 for the door plate 70 of melting vat 1 presently, if catalyst is added through door plate 70, the pipe utilized will aim the catalyst above the molten soltuion 3 until such time as the pipe bends from the intense heat and the end drops into the molten solution 3 to place the catalyst into the molten solution 3. It is desirable that the catalyst be placed directly into the molten solution 3.

The present invention provides for a curved dispensing pipe 69 which may be secured through coupling 68 to an extension pipe 67. Extension pipe 67 may be held at an appropriate level by a leveling means 72. The catalyst flows from process catalyst source 14, through catalyst transporting tube 13, and into extension pipe 67, which is controlled by control means 9, through the curved dispensing pipe 69 into the molten solution 3. The curved dispensing pipe 69 has a covering which has been frictioned and skimmed to form a homogenous unit.

The material on the pipe is a porous, elongatable, stretchable material which may be burlap. The material is layered in plies, frictioned, skimmed, and coated simultaneously on both sides as it is layered on the pipe.

One or more high temperature refractory aggregates may be combined to become high temperature refractory aggregate 88. High temperature refractory aggregate 88 provides strength and refractory properties at high temperatures.

The binder 89, basically, provides for the strength of the mortar on setting and when the refractory mixture 92 is set and subjected to high temperatures. The plasticizers 90 help make the refractory mixture 92 smooth and enable the refractory mixture 92 to be applied in a desired coating to improved pipe 49 or coated material pipe 49. The plasticizers 90 may or may not have refractory qualities. The liquid 91 may simply be potable water.

The refractory mixture 92 may be drier or wetter depending upon the amount of liquid 91 utilized. The amount of liquid 91 utilized should be the appropriate amount sufficient to provide for a smooth blend of the refractory mixture 92.

By utilizing one or more fast-setting catalysts 82–86, the refractory mixture 92 may be applied to fabric or wrapping material 50 to produce a coated material 51 on which the coating will set quickly enabling the coated material pipe 49 or improved pipe 49 to be manufactured and then quickly transported to a work site. Without this unique refractory mixture 92, the coated material pipe 49 or improved pipe 49 could require many days to set, causing delays and producing a product which does not reach the quality of the present invention.

A method for applying the chemical solution 24 or 48, which may be the refractory mixture 92, to the coated material pipe 49 or improved pipe 49 has been previously shown herein.

Figure 12:
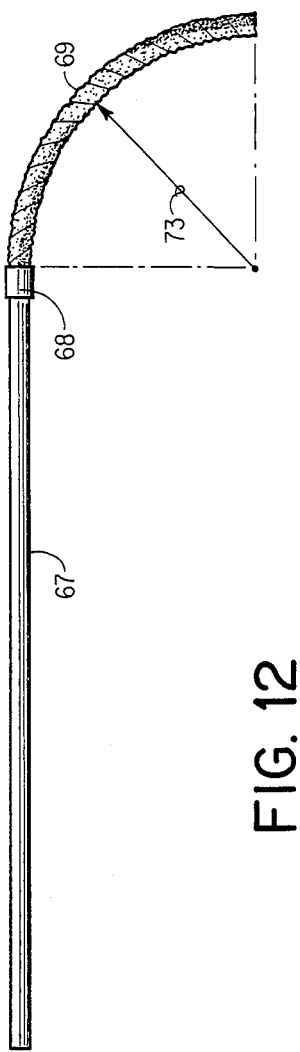
FIG. 12 is an elevational view of curved dispensing pipe 69 connected to extension pipe 67 by coupling 68.

FIG. 12 is an elevational view of curved dispensing pipe 69 connected to extension pipe 67 by coupling 68. Curved dispensing pipe 69 is shown having an appropriate radius dimension of thirty-six (36") inches. The radius dimension 73 may be any desired radius which, in essence, would give a desired curve to curved dispensing pipe 69. An extension pipe 67 is connected to curved dispensing pipe 69 by coupling 68.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A method for coating an elongated pipe with a coating composition, said method comprising:
   mounting said pipe for axial rotation relative to a trough containing a solution of said coating composition;
   passing a web of porous material from a web dispensing means through said trough in a position below the surface of said solution for coating said web, said web being passed around a bar mounted within said trough and having a web engaging surface below the surface of said solution;
   securing said web to said pipe by placing a leading end portion of said web against said pipe to extend longitudinally along a portion of the outer surface of said pipe, wrapping an adjacent portion of said web around said pipe so that said leading end portion crosses under a first complete turn of said adjacent portion and extends beyond said first turn and between said first turn and a second complete turn of said adjacent portion, and tensioning said web such that said adjacent portion of the web is drawn tightly around said pipe, the tensioning of said web causing said leading end porton to be tucked tightly under said first turn and between said first turn and said second turn so as to lock the beginning of a wrapping of said web to said pipe;
   turning said pipe to pull said secured web from said web dispensing means and to wrap additional portions of said secured web around said pipe, said secured web being pulled around said bar to coat said web with said solution before said additional portions thereof are wrapped around said pipe, and said secured web being pulled around a drag member having a stationary web contacting surface before being pulled around said bar, said drag member tensioning said web before said web is pulled around said bar; and,
   causing relative movement between said web dispensing means and said turning pipe in a direction parallel to the axis of said pipe to provide on the outer surface of said pipe a coating in the form of tightly wound spiral windings of said coated web extending along a coated length of said pipe.

2. The method of claim 1 in which each end of said bar is mounted in bearing flanges and said bar is turned by its engagement with said web.

3. The method of claim 1 in which said leading end portion of said web is coated with said solution before being tucked under said adjacent portion of said web.

4. The method of claim 1 in which said relative movement between said web dispensing means and said turning pipe is such that said spiral windings are overlapped to provide a coating comprising a plurality of layers of said coated web.

5. The method of claim 1 in which said web comprises a fibrous material.

6. The method of claim 5 in which said fibrous material is burlap.

7. The method of claim 1 in which the ends of said pipe are threaded so as to be engagable by a connection means for using said coated pipe to convey a catalyst from a catalyst source to an area of a melting vat beneath the surface of a molten metal contained in said vat, said web being wrapped around said pipe so that said threaded ends extend out from said coating.

8. A method for coating an elongated pipe comprising the steps of:
   dispensing a liquid coating composition into a stationary trough so as to maintain at least a predetermined level of said liquid in said trough;
   mounting said pipe for axial rotation over said stationary trough when said pipe is turned by a turning means;
   dispensing an elongated web of insulating material from a web dispensing means, said web having a leading end;
   passing said leading end of the web around a stationary drag member and then around an elongated bar positioned above the bottom of said stationary trough;
   securing said web of said pipe by place a leadng end portion of said web against said pipe to extend longitudinally along a portion of the outer surface of said pipe, wrapping an adjacent portion of said web around said pipe so that said leading end portion crosses under a first complete turn of said adjacent portion and extends beyond said first turn and between said first turn and a second complete turn of said adjacent portion, and tensioning said web such that said adjacent portion of the web is drawn tightly around said pipe, the tensioning of said web causing said leading end portion to be tucked tightly under said first turn and between said first turn and said second turn so as to lock the beginning of a wrapping of said web to said pipe;
   turning said pipe with said leading end of the web secured thereto such that said web is dispensed from said web dispensing means, pulled around said drag member, pulled around said bar, and wound on said pipe to wrap additional portions of said secured web around said pipe; and,
   moving said web dispensing means relative to said stationary trough in a direction transverse to the direction in which said web is being dispensed from said web dispensing means and substantially parallel to the rotational axis of said pipe such that said web is spirally wound on said pipe;
   said elongated bar having a web contacting surface below said predetermined level of liquid beng maintained in said stationary trough such that said web is pulled through and coated with said liquid coating composition when said pipe is turned by said turning means, said drag member being positioned between the path of movement of said web dispensing means and said predetermined liquid level in said trough such that the turning of said pipe by said turning means causes uncoated web to be pulled around said drag member before being pulled around said bar and coated with said liquid coating composition;

said drag member having a stationary web contacting surface around which said web is pulled to provide frictional engagement for tensioning said web and causing said spiral windings of coated web to be drawn tightly around said pipe;

and the web contacting surfaces of both said drag member and said bar extending substantially parallel to the rotational axis of said pipe such that said movement of said web dispensing means relative to said stationary trough causes said uncoated web to travel along said drag member and said coated web to travel along said bar in directions transverse to the direction in which said web is being dispensed.

9. A method according to claim 8 in which said movement of said web dispensing means causes said uncoated web to move along the web contacting surface of said drag member and said coated web to move along the web contacting surface of said bar for distances substantially equal to the length of the portion of said pipe to be coated with said coated web.

10. The method of claim 8 in which said relative movement between said web dispensing means and said trough is such that said spiral windings of coated web are overlapped to provide a pipe coating comprising a plurality of layers of said coated web.

11. A method according to claim 8 in which said web comprises a porous fabric, and said pipe comprises a tubular structure meltable in a solution of molten metal.

12. A method according to claim 8 in which said web comprises a fibrous material.

13. A method according to claim 12 in which said fibrous material is burlap.

14. A method according to claim 8 further comprising the step of cutting said spirally wound web from the web being dispensed by said dispensing means when said coated web has been spirally wound around a coated length of said pipe.

15. A method according to claim 8 in which said web is further tensioned by contact with the web contacting surface of said bar while said web is being spirally wound on said pipe.

16. A method according to claim 8 which further comprises the steps of:
    removing excess liquid coating composition from said tightly wound web on said pipe;
    removing said coated pipe from its mounting over said trough; and,
    drying said coated pipe.

17. A method according to claim 11 in which said coating composition comprises a refractory material.

18. A method according to claim 1 in which said coating composition comprises a refractory material.

* * * * *